United States Patent [19]

Weyler, Jr.

[11] 4,190,626
[45] Feb. 26, 1980

[54] METHOD OF MANUFACTURE OF BONDED FIBER FLYWHEEL

[75] Inventor: George M. Weyler, Jr., Huntsville, Ala.

[73] Assignee: The United States of America as represented by the Administrator of the National Aeronautics and Space Administration, Washington, D.C.

[21] Appl. No.: 912,276

[22] Filed: Jun. 5, 1978

[51] Int. Cl.² .................... B29D 3/00; G05G 1/00
[52] U.S. Cl. .................... 264/229; 74/572; 156/74; 156/161; 156/165; 156/285; 156/294; 264/231; 264/258; 264/259; 264/311
[58] Field of Search .......... 156/74, 161, 163, 165, 156/185, 189, 228, 245, 285, 293, 160, 294; 264/310, 311, 258, 231, 229, 259; 74/572

[56] References Cited

U.S. PATENT DOCUMENTS

| 2,783,174 | 2/1957 | Stephens | 264/311 |
|---|---|---|---|
| 2,785,442 | 3/1957 | Boggs | 264/311 |
| 2,999,780 | 9/1961 | Perrault | 264/311 |
| 3,296,886 | 1/1967 | Reinhart | 74/572 |
| 3,354,014 | 11/1967 | Schick et al. | 156/285 |
| 3,966,523 | 6/1976 | Jakabsen et al. | 264/258 |
| 4,002,714 | 1/1977 | Usui | 264/311 |
| 4,036,080 | 7/1977 | Friedericy et al. | 156/74 |
| 4,098,142 | 7/1978 | Weyler | 74/572 |
| 4,102,221 | 7/1978 | Hatch | 74/572 |

OTHER PUBLICATIONS

Post et al., "Flywheels", *Scientific American*, pp. 17–23 (12/73).

Primary Examiner—Jerome W. Massie
Attorney, Agent, or Firm—George J. Porter; John R. Manning; L. D. Wofford, Jr.

[57] ABSTRACT

The method of manufacture of a fiberglass-epoxy flywheel wherein layers of fiberglass cloth, generally forming a circular mass, are pre-stressed by rotation during the curing of epoxy which surrounds and thereby couples together fibers and layers of the cloth.

7 Claims, 9 Drawing Figures

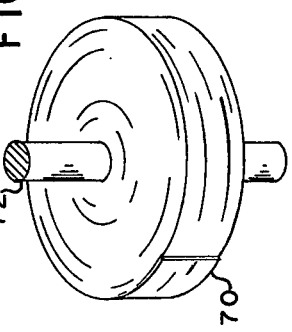
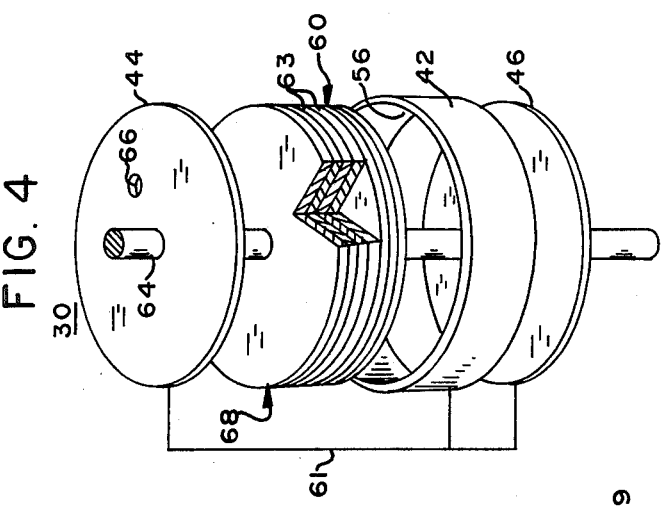
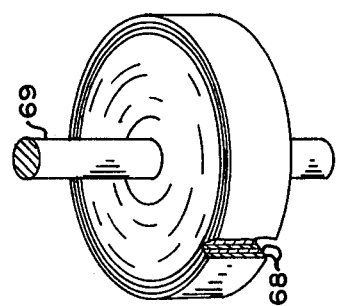
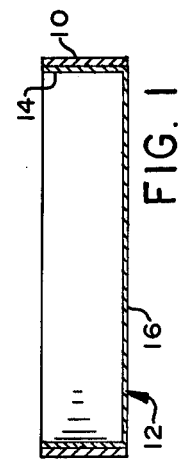
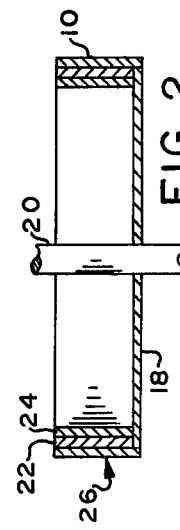
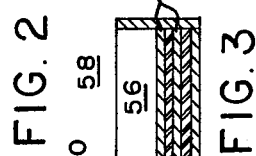
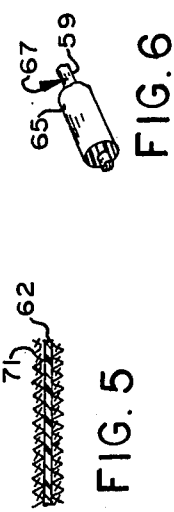

METHOD OF MANUFACTURE OF BONDED FIBER FLYWHEEL

ORIGIN OF THE INVENTION

The invention described herein was made by an employee of the United States Government, and may be manufactured and used by or for the Government of the United States for governmental purposes without the payment of any royalties thereon or therefor.

BACKGROUND OF THE INVENTION

1. Field of the Invention

This invention relates to the art of construction of flywheels, and particularly to a method of construction of a fiberglass-epoxy composition flywheel.

2. General Description of the Prior Art

It has been suggested that flywheels be constructed of relatively low mass, but high tensile strength materials, and in accordance with this suggestion, flywheels have been constructed of fiberglass fibers bonded together with an epoxy or epoxy resin. However, reports from tests of flywheels so constructed have been disappointing, it appearing that structural failures occur at flywheel speeds less than speeds at which failure should occur considering the known tensile strength of the fibers of the fiberglass. The failures were manifested by progressive delamination (from center outward) of the flywheels tested. As a result, efforts have been underway to improve the construction of fiberglass-epoxy flywheels, and a number of proposed flywheel configurations have appeared. Illustrations of certain of these appeared in the December 1973 issue of *Scientific American*. While some improvements in performance may have been achieved by varying the structural configuration, as far as is known, flywheels have not as yet been constructed which will withstand operational forces on the order of the tensile strength of reinforcing fibers employed, an obvious design objective.

SUMMARY OF THE INVENTION

The applicant has determined that the basic problem has been that the previous methods of construction have all involved the employment of either unstressed or non-uniformly stressed fibers, and that because of one or both of these conditions, there is unevenness in strength, with at least some regions of a flywheel being reinforced to strengths substantially below the tensile strength of the fibers. To solve this problem, the applicant has determined that the fibers should be pre-stressed, and that this be done by centrifugal force applied during the curing and hardening of the epoxy being reinforced by the fibers.

BRIEF DESCRIPTION OF THE DRAWINGS

FIG. 1 is a sectional view cut through the center of a round cylinder and showing the construction of a rim-shaped mold form employed in constructing a flywheel as contemplated by the method of this invention.

FIG. 2 is a sectional view of one-half of a circular mold form employing the rim-shaped form shown in FIG. 1.

FIG. 3 is a sectional view similar to the view of FIG. 2, illustrating the construction of top and bottom mold forms employed in the construction of a flywheel as contemplated by this invention.

FIG. 4 is an exploded pictorial view, partially broken, illustrating the arrangement of flywheel components as contemplated by this invention.

FIG. 5 is an edge view showing a layer of epoxy between two layers of fiberglass cloth.

FIG. 6 is a pictorial view of a pre-coated glass fiber.

FIG. 7 is a pictorial view illustrating a modified form of construction to that shown in FIG. 4 wherein fiberglass fabric is in the form of concentric belts.

FIG. 8 is a pictorial view illustrating still another arrangement for fiberglass fabric wherein the fabric is simply wound about the axis of the flywheel.

DETAILED DESCRIPTION OF THE DRAWINGS

Figure 9:
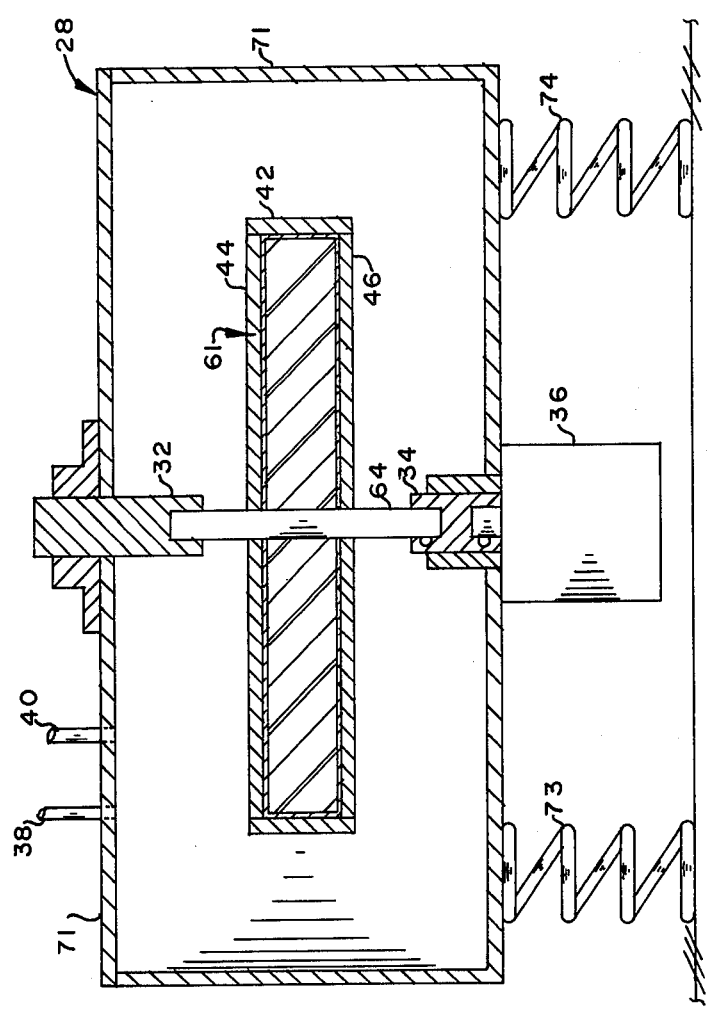
FIG. 9 is a half sectional view, partly schematic, of the overall arrangement of components employed in the method contemplated by this invention.

It is to be appreciated that in view of the construction technique employed, as outlined above, the mold form in which a flywheel is being molded must have a strength not greatly less than the flywheel itself. Accordingly, and as a first step, illustrated in FIG. 1, a rim 10 of fiberglass and epoxy is formed in a conventional manner on a mandral 12, mandral 12 having a rim form 14 supported by round supporting plate 16 for supporting rim form 14.

Next, as shown in FIG. 2, after rim 10 is cured, it would be attached by means such as an end plate 18, frictionally positioned within rim 10 as shown, to an axle 20, and with a mold release or mold release material 22 (shown thicker than normal for ease of illustration) applied to the inner surface of rim 10. A fiberglass belt 24, either pre-coated with epoxy or otherwise saturated with epoxy, would be formed of a slightly smaller diameter than the inner surface of mold release 22 and would be positioned just inside mold release 22. Thereafter, the whole mold assembly 26 as thus formed would be positioned in a curing chamber similar or identical to curing chamber 28, shown in FIG. 9. Thus, for example, in place of flywheel mold assembly 30, positioned for rotation within curing chamber 28, as will be later described, mold assembly 26 would be suspended between bearing 32 and drive coupling 34. In this manner, shaft 20 would be driven through coupling 34 by motor 36. Motor 36 is adapted to drive mold assembly 26 at a selected speed to effect a centrifugal force which causes belt 24 to uniformly go into tension and to uniformly stress the fibers of belt 24 at a desired force level. Curing of epoxy around belt 24 is effected by the frictional drag of air on mold assembly 26, and this is regulated by air pressure input 38 and air vacuum connection 40, enabling a desired air density to exist in chamber 28 and to thus frictionally engage mold assembly 26. Accordingly, by this arrangement, a fiberglass rim 42 is formed through the curing of epoxy around fiberglass belt 24 while it is pre-stressed.

Rim 42, thus constructed, may be employed directly in the forming of a flywheel or may be employed as a form for the construction of a stronger rim. In the latter case, the rim making process would be repeated using fiberglass rim 42 as a form as was rim 10. When this is done, curing of a rim form would be accomplished with progressively higher rotational speeds for increased pre-stressing, and thereby increased rim strength. When a series of rims are made in this fashion, it is, of course, necessary to properly size the rims so that the final rim is of a desired size for a desired dimensioned flywheel to be molded within it.

Once a desired strength rim form is formed, e.g., rim form 42 in FIG. 4, identical top and bottom plate forms 44 and 46 for cylindrical mold 30 may be formed generally in the same pre-stressed manner by positioning fiberglass cloth-epoxy matrix elements 48 within rim 42, rim 42 then being attached (frictionally) to axle 50 by bottom mold release plate 52, formed of a suitably strong material, such as steel. Matrix elements are separated or engaged by additional mold release plates 54, and as illustrated, the two plate forms, which are used as top and bottom plate forms 44 and 46 for flywheel mold 30, are formed at one time. If desired, the entire cavity 56 within rim 42 may be filled with fiberglass-epoxy matrix elements 48, and thus bottom and top plates for several flywheel molds may be made at one time.

As in the case of the construction of rim 42, mold assembly 58 would be positioned within chamber 28 (FIG. 9) and rotated by motor 36. This pre-stresses the fibers of the fiberglass of matrix elements 48 and epoxy of the matrix elements is hardened by frictional heating on rim 42 and bottom and top positioned mold release plates 52 and 54. In order to obtain sufficient strength for release plates, they may be made of fiberglass and in progressive steps as in the case of the rims.

FIG. 4 illustrates the discrete elements of a flywheel 60 and case 61 where flywheel 60 is formed utilizing a plurality of flat circular sheets 63 of fiberglass cloth which have been pierced by axle 64. Top and bottom plate form or form members 44 and 46, together with rim form 42, as case 61, enclose flywheel 60, the plate and rim forms being secured together by means not shown, such as by frictionally fitting the plate forms in a rim form. Epoxy 62 is applied to saturate sheets 63 (FIG. 5), being either applied prior to the closure of case 61 around flywheel 60 (as from pre-coated fibers) or through an opening or openings 66 formed in top plate form 44, enabling epoxy to be applied after the flywheel is enclosed. Alternately, some epoxy would be applied to fiberglass sheets 63 prior to encasing it, and additional epoxy would be applied through opening or openings 66 after the flywheel is encased. Various additional openings and cavities may be employed as needed to fill all voids in case 61, or alternately, some voids may be filled subsequent to the curing in chamber 28 and thereafter the added epoxy cured. In some instances, the employment of pre-coated fibers 67 (FIG. 6) formed of an inner strand fiber 59 and outer coating of epoxy 65 may make unnecessary any separate handling of epoxy.

After case 61 is filled with a desired quantity of epoxy, case 61 is placed within chamber 30 as shown in FIG. 9 and axle 64 driven by motor 36 to rotate case 61 at a desired speed to appropriately pre-stress the fibers of the fiberglass cloth. As described above, a desired air pressure, above or below atmospheric pressure, would be effected by means of a vacuum connection 38 and pressure connection 40. This thus provides a selected density of air mass in chamber 28 and thus a selected degree of frictional force between this air mass and case 61 to provide a desired curing rate. Curing chamber 28 is totally enclosed by walls 71 and is shock mounted on springs 73 and 74. At least one wall section is removable or has an opening (not shown) by which molds are loaded into and removed from chamber 28.

It has been previously determined that radial stresses are minimum at the periphery and center of a flywheel and highest mid-way between the center and periphery and that circumferential stresses are highest at the center. In keeping with these findings, the curing process would be sequenced wherein initially curing would be effected in the outer peripheral region utilizing a less than maximum rotational speed (at peripheral speeds as low as 300 feet per minute) for curing, but with a relatively high air pressure whereby outer peripheral curing would occur first because of this combination. This then would, in effect, provide a cured and thus reinforced case hardening for the flywheel, and thereafter the speed of rotation of it might be significantly increased (to peripheral speeds as high as 60,000 feet per minute for some glass fibers) to increase the stressing of fibers to a greater extent in the mid region and inner region of the flywheel as required. At the same time, the gas pressure in chamber 28 would be proportionately decreased. While in the two-step procedure of curing there would be a difference in stressing between the outer peripheral region and region inner to it, there would be uniformity of stressing at like radial distances from the center of the flywheel. In addition to obtaining a desired stressing pattern in this manner, there may be instances where the outer peripheral region of a flywheel may be cured in this fashion without the requirement of an outer rim as a mold, and thereafter the cured outer peripheral region serving as a mold for the inner regions of the flywheel as required by the higher speeds during its curing.

After the epoxy applied to fiberglass sheets 63 has hardened, case 61 is removed. A flywheel 60, thus constructed, is removed after curing, and having been pre-stressed prior to and during curing, will provide an overall strength commensurate with the tensile strength of the fibers of the fiberglass cloth.

The actual arrangement of fiberglass cloth may be varied as desired and still appropriately achieve a selected degree of prestressing of fibers. Thus, FIG. 7 illustrates a flywheel wherein instead of flat sheets of fiberglass, the fiberglass is formed in concentric belts 68 about axle 69. As still another arrangement, FIG. 8 illustrates the fiberglass cloth being in the form of a strip 70 wound around axle 72.

While the term epoxy is used to describe a bonding agent commonly employed with fiberglass, it is to be appreciated that other suitable bonding materials may be employed.

Equally significant, because of the nature of the pre-stressing technique employed, the fibers tend to be stressed naturally and as would the finished product be stressed in operation. Accordingly, the fibers are pre-stressed as needed for maximum reinforcement strength.

Having thus described my invention, what is claimed is:

1. The method of constructing a flywheel comprising:
    forming a desired dimensioned, round, cylindrically-shaped, matrix of layered, glass fiber cloth within a cylindrical case, and there being an uncured fiberglass bonding material covering the fibers of the cloth and between layers of cloth and filling the case;
    placing a vertically positioned axle concentrically through said round matrix;
    while said bonding material is still in an uncured state, placing said case within a curing chamber with said axle rotably supported;
    rotably driving said axle, whereby fibers of said matrix are stressed by centrifugal force; and while said matrix is so rotably driven, applying a desired degree of heat to said matrix and effecting the curing of said bond material with fibers of said matrix in a stressed state, and fibers of said matrix becoming bonded together and to said axle.

2. The method as set forth in claim 1 wherein said layers of said matrix are formed of generally flat, round sheets of fiberglass cloth lying generally normal to and pierced by said axle.

3. The method as set forth in claim 1 wherein said layers are formed of concentrically formed and positioned belts of fiberglass cloth arranged concentrically about said axle.

4. The method as set forth in claim 1 wherein said case is formed of pre-stressed fiberglass impregnated with a bonding material.

5. The method as set forth in claim 1 wherein said matrix is positioned within a chamber, and gas pressure within said chamber is selectively regulated to provide a selected degree of frictional force between gas and said matrix, and thereby selectively regulating the amount of heat applied to said matrix as it is rotated.

6. The method as set forth in claim 5 wherein initially the curing is effected, utilizing a combination of a selected speed and gas pressure, and thereafter a combination of higher speed and lower gas pressure.

7. The method as set forth in claim 1 wherein fibers of the fiberglass cloth are pre-coated with a bonding material before said cloth is formed into said matrix.

* * * * *